Patented Sept. 18, 1945

2,384,888

UNITED STATES PATENT OFFICE 2,384,888

POLYMERIC SULPHUR CONTAINING DERIVATIVES AND PROCESS FOR THEIR PREPARATION

William James Burke, Marshallton, Del., assignor to E. I. du Pont de Nemours & Company, Wilmington, Del., a corporation of Delaware No Drawing. Application March 4, 1944, Serial No. 525,093

14 Claims. (Cl. 260—231)

This invention relates to polymeric, sulphur-containing materials and more particularly to new polymeric thiolcarboxylates and the corresponding thiols.

Derivatives of cellulose, polyvinyl alcohol, starch and related hydroxyl-containing polymers which find application as fibers, films, plastics, and ingredients of coating compositions do not, in general, possess to a sufficiently high degree such important properties as resilience and solvent resistance. Improvements in these properties have been obtained by various after-treatments but such objectionable changes as embrittlement or loss of strength often occur simultaneously. Moreover, these treatments in many cases involve technical difficulties. Furthermore, other polymers even though not hydroxylated are capable of improvement in their physical and chemical properties.

This invention has as an object the improvement of polymeric materials. A further object is the provision of new polymeric thiolcarboxylates and particularly thiolacetates which can readily be converted by a simple process into highly solvent resistant and resilient shaped articles and coatings. Another object is the provision of a new class of polymeric polythiols. Other objects will appear hereinafter.

These objects are accomplished by the following invention wherein a thiolcarboxylic acid, preferably thiolacetic acid, is reacted with a linear high polymer, i. e., a macromolecular polymer, having extralinear ethylenically unsaturated substituents which are attached to the polymer chain through oxygen. The resulting polymeric thiolcarboxylates and the polymeric thiols obtained therefrom by hydrolysis are likewise phases of the present invention.

The polymeric thiolcarboxylates are preferably prepared by reacting a linear, high molecular weight polymer having ethylenically unsaturated substituents attached to the chain through ether oxygen with a thiolcarboxylic acid, preferably thiolacetic acid, at 20 to 100° C. for one to twenty-four hours in the presence of an inert solvent, i. e., one which is non-reactive toward thiolcarboxylic acids and ethylenic unsaturation. In general, at least one mol of thiolcarboxylic acid is used per ethylenic double bond. Oxygen and peroxy compounds are effective catalysts for the reaction. The polythiolacetates are conveniently isolated by pouring the reaction mixture into a vigorously agitated liquid which is a coagulant for the product. In certain instances it is desirable to form shaped articles such as films or fibers directly from the reaction mixture.

The polymeric thiolcarboxylates, and especially the thiolacetates, either in solution or in the form of shaped objects, are readily hydrolyzed by alkaline agents to the corresponding polythiols. By controlling hydrolytic conditions, it is possible to convert all or any desired part of the thiolcarboxylate substituents to thiol groups. The polythiols upon exposure to air or more rapidly in the presence of pure oxygen or oxidizing agents are converted to insoluble products having excellent resistance to organic solvents and in the case of fibers, a high degree of resilience. Ordinarily it is preferable to carry out the oxidation step during or after the formation of shaped articles or coatings.

The more detailed practice of the invention is illustrated by the following examples, wherein parts given are by weight. There are, of course, many forms of the invention other than these specific embodiments.

Example I

Crotylethylcellulose containing 1.6 ethyl and 0.8 crotyl groups per glucose unit is prepared by the following procedure. Alkali cellulose (770 parts, containing 1.5 mols of cellulose, prepared by steeping cotton linter pulp in 18% sodium hydroxide containing 1% sodium formate for one hour, pressing, and shredding for two hours) is added to a nickel autoclave along with 2000 parts of benzene, 784 parts of pulverized sodium hydroxide (total sodium hydroxide =22.5 mols), 305 parts of crotyl chloride (3.4 mols) and 871 parts of ethyl chloride (13.5 mols). The air in the autoclave is replaced with nitrogen and the reaction mixture is stirred and heated at 115° C. for 12 hours. After the autoclave is cooled to room temperature, 3000 parts of water is added with stirring. The resultant thick stable emulsion is added slowly with vigorous agitation to water at 90° C. in a stainless steel tank. The product separates out in a finely divided porous form and the stirring is continued for one hour at 90° C. The crotylethylcellulose is washed successively with water, 0.5% acetic acid, water, 0.5% ammonium hydroxide, and finally with distilled water. The product has an iodine number of 83 and analyzes for 58.6% carbon and 8.8% hydrogen.

To eight parts of the crotylethylcellulose dissolved in 40 parts of benzene is added 4.8 parts of thiolacetic acid (2 mols of thiolacetic acid/double bond) and 0.1 part ascaridole. After 24 hours at 25° C. the reaction mixture is cast into films which are washed thoroughly with petroleum ether in order to remove unreacted thiolacetic acid. The resulting product analyzes for 4.0% sulphur. This indicates the presence of 0.34 acetylthiobutyl group per glucose unit, or stated in another way, addition of thiolacetic acid to 43% of the available double bonds of the crotylethylcellulose. Films cast from benzene-methanol (90–10) solution are clear, bright, and flexible. They are comparable in tensile strength and elongation to fibers of the original crotylethylcellulose.

A film of the acetylthiobutyl derivative is placed in a 10% aqueous sodium sulphide solution for 16 hours and then washed successively with water, 1% acetic acid, and finally with water. The resulting mercaptobutylethylcellulose film is intially soluble in benzene-methanol (90–10) but upon exposure to air gradually becomes crosslinked and is insoluble in the usual organic solvents for cellulose ethers. After treatment with a benzene-methanol (90–10) solution containing ethyl mercaptoacetate, the crosslinked film dissolves. The reactions which occur can be represented by the following equations:

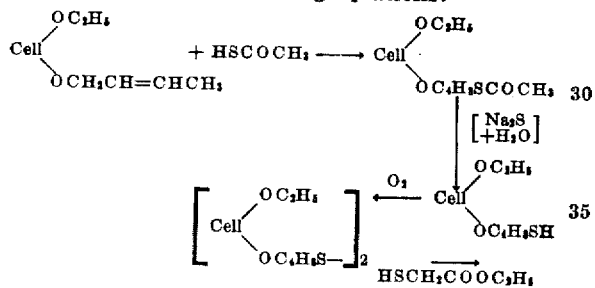

*Example II*

Crotylethylcellulose containing 1.3 crotyl and 0.6 ethyl groups per glucose unit is prepared by a procedure similar to that described in Example I, with the exception that 6.7 mols of ethyl chloride and 3.3 mols of crotyl chloride are used per mol of cellulose.

To eight parts of this crotylethylcellulose dissolved in 40 parts of benzene is added 6.5 parts of thiolacetic acid. The reaction mixture is heated at 85° C. under reflux for seven hours and then cast into film. After washing with petroleum ether and then with water, the product analyzes for 5.4% sulphur. The polymeric thiolacetate is hydrolyzed to the corresponding polythiol by treatment with a 10% solution of potassium hydroxide in aqueous ethanol (70–30) for 24 hours. The film is washed free of alkali with water, dried, and exposed to air. After 24 hours the film is no longer soluble in benzene-methanol (90–10). Addition of five parts of a 5% solution of sodium methylate to 50 parts of a 10% solution of the above acetylthiobutyl derivative in dioxane-methanol (80–20) results in substantially complete conversion to the corresponding polythiol in five minutes at 25° C.

Instead of crotylethylcellulose there may be used methallylethylcellulose, crotylcellulose or isobutenylcellulose.

*Example III*

Forty parts of crotylethylcellulose containing 0.9 crotyl and 1.8 ethyl groups per glucose unit is dissolved in 36 parts of dioxane. Thirty parts of thiolacetic acid and 0.8 part of ascaridole are added and oxygen is bubbled through the solution. After 60 hours at 25° C. the reaction mixture is diluted with 150 cc. of methanol and poured in a thin stream into 2000 parts of water with vigorous stirring. After being washed thoroughly with water and dried, the fluffy white solid product contains 2.5% sulphur.

Similar results are obtained when the crotylethylcellulose is replaced with a cellulose acetate methacrylate containing 2.0 acetyl and 0.5 methacryl groups per glucose unit.

*Example IV*

Eight parts of N-allyloxymethylpolyhexamethyleneadipamide, prepared by reacting polyhexamethyleneadipamide with formaldehyde and allyl alcohol and containing approximately one allyloxymethyl group per two carbonamido groups, is dissolved in 80 parts of glacial acetic acid. Ten parts of thiolacetic acid, one part of acetic anhydride and 0.2 part of ascaridole are added and the reaction mixture is stirred at 70° C. for seven hours. The reaction product is precipitated by addition of water, washed with water, dissolved in a 90/10 mixture of methanol and water and finally reprecipitated by addition of water. The acetylthiopropoxymethylpolyhexamethyleneadipamide, after washing with acetone and drying, contains 7.36% of sulphur, or slightly less than one half atom of sulphur per carbonamido group. The solid product gives highly elastic, clear films when cast from ethanol-water (90–10) and is readily insolubilized by hydrolysis with alcoholic potassium hydroxide, followed by washing with dilute acetic acid and water and oxidation by exposure to air. The probable reactions are as follows:

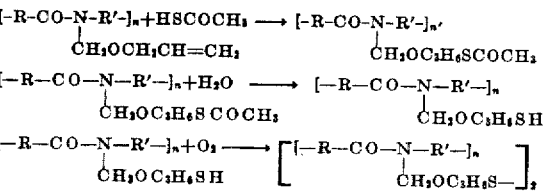

In the above example, the unsaturated ether group is attached to the linear polymeric chain through an intervening methylene group and $n$ represents the number of recurring units in the polymer chain.

In carrying out the process of this invention, there can be employed any linear, high molecular weight polymer having ethylenically unsaturated substituents attached to the chain through oxygen, directly attached to the polymer chain or indirectly as in Example IV. Such polymers may be hydroxylated polymers in which part, at least, of the hydroxyl groups have the hydrogen replaced by an ethylenically unsaturated substituent. Suitable linear, high molecular weight hydroxylated polymers include cellulose, starch, polyvinyl alcohol, hydrolyzed vinyl acetate-ethylene interpolymers, N-hydroxymethyl polyamides, etc. The ethylenic unsaturation can be present in substituents such as ether, ester, acetal, ketal, and carbamate, which are linked to the polymer chain through oxygen. Specific examples include methallylethylcellulose, cellulose acetate allylcarbamate, cellulose acetate crotonate, cellulose butyrate methacrylate, crotylmethylstarch, crotylcellulose, crotylbenzylcellulose, allylcellulose, allylethylcellulose, higher ethers of cellulose such as those made by reacting cellulose with 5-bromopentene-1, 6-iodohexane-2, beta-chloroethyl vinyl ether, etc., methallyl ethers of polyvinyl alcohol, acetals from polyvinyl alcohol and acrolein, mixed acetals of polyvinyl alcohol with butyraldehyde and acrolein, N-crotyloxypolydecamethylenesebacamide, etc. Organic solvent-soluble unsaturated derivatives of hydroxylated polymers react with thiolcarboxylic acids with particular ease, show less tendency toward side reactions, and yield derivatives which are particularly useful since they can be easily fabricated into shaped articles. Polymers having no, or only a minor proportion of, unsubstituted hydroxyl groups, (e. g., completely etherified cellulose, polyvinyl alcohol or N-alkoxymethyl polyamides in which part at least of the ether groups are unsaturated) react more efficiently with thiolcarboxylic acids to form thiolcarboxylates than those having a high proportion of free hydroxyl groups since the thiolcarboxylic acid can react with free hydroxyl groups to form esters and consequently more reagent is required to introduce a given number of thiolacetate groups where hydroxyl groups are present. Therefore, those polymers in which at least half the hydroxyl groups have the hydrogen replaced are preferred.

Both aliphatic and aromatic thiolcorboxylic acids can be used, including thiolacetic, thiolpropionic, thiolhexanoic, and thiolbenzoic acids. Thiolacetic acid is preferred as it is particularly reactive and is readily prepared from inexpensive raw materials. Although the reaction is preferably carried out in the presence of a solvent or swelling agent, an intimate mixture of the thiolcarboxylic acid and the unsaturated polymer can be used. Suitable inert solvents include dioxane, benzene, saturated petroleum fractions, and ethyl acetate. Addition of a catalyst is not essential for reaction but it has been found advantageous to conduct the reaction in the presence of oxygen or a peroxy compound or both. Suitable peroxy compounds include ascaridole, diethyl peroxide, benzoyl peroxide, and peracetic acid. The reaction takes place readily at temperatures ranging from 10° C. to the boiling point of the solvent used or of thiolacetic acid through higher temperatures, up to the decomposition temperature, of the reactants can be used if desired, e. g., by operating in a closed vessel.

The polymeric thiolcarboxylates of this invention are resinous to solid materials whose properties depend largely on those of the starting unsaturated polymers. For example, the thiolcarboxylates derived from highly substituted crotylcellulose are low softening, soluble in aromatic hydrocarbons and have relatively low tensile strength, whereas those derived from a low substituted N-allyloxymethyl nylon have high tensile strength, high softening point and are capable of being cold drawn. In general, the polymeric thiolcarboxylates of this invention are odorless, have little or no color and show excellent stability under atmospheric conditions. The preferred products are readily soluble in organic solvents and can be formed into shaped objects without difficulty.

The polythiolcarboxylates, including the preferred polythiolacetates, can be hydrolyzed either in solution or in solid form to polythiols with acids or bases. Specific examples of suitable hydrolytic agents include p-toluenesulphonic, sulphuric, and hydrochloric acids, and bases such as sodium hydroxide, ammonium hydroxide, sodium methylate, and soldium sulphide. Alkaline agents are generally preferred since they bring about hydrolysis in a shorter time and under milder conditions than acids. By proper choice of time, temperature, and concentration of hydrolytic agent, it is possible to convert all or any desired portion of the thiolcarboxylate substituents to thiol groups. Since polythiols have a tendency to oxidize to insoluble products, it is advantageous to conduct the hydrolysis in an inert atmosphere such as nitrogen, when soluble polythiols are desired. The conversion of polythiols to insoluble products is accelerated by salts such as cobalt and iron naphthenates and by peroxy compounds such as hydrogen peroxide, peracetic acid, and diethyl peroxide.

The present invention represents a subgenus under the general invention of my copending application S. N. 503,417, filed September 22, 1943, and in certain aspects a subgenus under the invention of the copending application of E. F. Izard, S. N. 518,877, filed January 19, 1944.

The polymeric polythiolcarboxylates such as the thiolacetates of this invention are useful in the form of fibers, films, plastics, and as ingredients of coating compositions and lacquers. Shaped articles from the polymeric thiolacetates can readily be converted to polymeric thiols during or after formation of shaped articles. Upon oxidation by air, if desired, in the presence of catalysts such as cobalt or iron salts, the polythiols are converted to insoluble products which show excellent resistance to solvents. The same result is attained when, instead of oxidizing the thiols, they are treated with alkylene dihalides such as trimethylene dibromide, or when they are reacted with formaldehyde. The final products (whether oxidized or cross-linked with bifunctional reagents) have increased tensile strength, particularly at elevated temperature, lowered elongation, higher softening point and hardness and improved dimensional stability, as well as increased solvent resistance and resilience.

The thiolacetates are preferred since they can be prepared with great ease and yield the same polythiols upon hydrolysis with smaller loss in weight than the derivatives of higher molecular weight thiolcarboxylic acids. Preferred from another standpoint are the acetylthioalkoxy derivatives. The acetylthioalkoxy derivatives of this invention contain at least two carbons in the alkoxy group, since they are derived from polymers containing an ethylene double bond in an extralinear ether group. Preferably, they contain at least three carbons in the alkoxy group since vinyl ethers of polymeric hydroxyl materials, e. g., vinyl cellulose, are in general difficult to prepare. Ethers containing from two to six carbon atoms in the alkoxy group are preferred. These products can be easily hydrolyzed to the corresponding mercapto derivatives. Of these, a particularly interesting class are the acetylthioalkoxycellulose derivatives. These products are readily prepared and are especially useful in the preparation of shaped articles and coating compositions. In addition, they are based on cellulose, an inexpensive raw material. A species of this class is that of the acetylthiobutyl cellulose derivatives. These products are readily prepared from cellulose ethers containing crotyl and methallyl groups. These cellulose ethers are more easily accessible than other unsaturated cellulose ethers. With the polythiolacetates from unsaturated esters, careful control over hydrolysis conditions must be exercised in order to avoid elimination of sulphur from the polymer.

From the acetylthioalkoxy derivatives there are obtained on hydrolysis the mercaptoalkoxy derivatives which are of particular utility as pointed out above. Of these, the mercaptobutyl cellulose derivatives are of particular interest because of their easy preparation from available materials.

The above description and examples are intended to be illustrative only. Any modification thereof or variation therefrom which conforms to the spirit of the invention is intended to be included within the scope of the claims.

What is claimed is:

1. A mercaptobutyl ether of cellulose.
2. A mercaptoalkyl ether of cellulose having at least two carbons in the mercaptoalkyl group.
3. An acetylthiobutyl ether of cellulose.
4. An acetylthioalkyl ether of cellulose wherein the alkyl group contains at least two carbons.
5. A polymer having a side chain connected to the chain of said polymer through ether oxygen and having on said side chain a bivalent sulphur separated from the ether oxygen by at least two carbons and in turn attached to a member of the class consisting of hydrogen, an acyl radical, and bivalent sulphur further bonded to a side chain linked by ether oxygen to such a polymer chain.
6. A polymer having an acylthio substituent on a side chain linked to the polymer chain through ether oxygen and separated from the ether oxygen by at least two carbons.
7. A polymer having a mercapto substituted side chain linked to the polymer chain through ether oxygen and separated from the ether oxygen by at least two carbons.
8. Process which comprises reacting a thiolcarboxylic acid with a polymer having an ethylenically unsaturated side chain linked to the polymer chain through oxygen.
9. Process which comprises reacting a thiolcarboxylic acid with a hydroxylated polymer having an ethylenically unsaturated side chain linked to the hydroxylated polymer chain through ether oxygen.
10. Process which comprises reacting a thiolcarboxylic acid with an hydroxylated polymer having an ethylenically unsaturated side chain linked to the hydroxylated polymer chain through ether oxygen in an inert solvent and in the presence of a peroxide catalyst.
11. Process which comprises reacting, in an inert solvent and in the presence of a peroxide catalyst, a thiolcarboxylic acid with a cellulose derivative having hydroxyl hydrogen replaced by an ethylenically unsaturated substituent.
12. Process which comprises reacting, in an inert solvent and in the presence of a peroxide catalyst, thiolacetic acid with an unsaturated ether of cellulose.
13. Process of claim 8 wherein the acyl-ether derivative is hydrolyzed to the corresponding thiol.
14. Process of claim 8 wherein the acyl-ether derivative is hydrolyzed to the corresponding thiol and this is oxidized to the corresponding disulphide.

WILLIAM JAMES BURKE.

CERTIFICATE OF CORRECTION.

Patent No. 2,384,888.   September 18, 1945.

WILLIAM JAMES BURKE.

It is hereby certified that error appears in the printed specification of the above numbered patent requiring correction as follows: Page 2, first column, line 19, for "intially" read --initially--; and second column, line 36, Example IV, for that portion of the formula reading " n' " read --n--; page 3, second column, line 13, for "general" read --generic--; and that the said Letters Patent should be read with this correction therein that the same may conform to the record of the case in the Patent Office.

Signed and sealed this 15th day of January, A. D. 1946.

Leslie Frazer (Seal)    First Assistant Commissioner of Patents.

cellulose derivatives are of particular interest because of their easy preparation from available materials.

The above description and examples are intended to be illustrative only. Any modification thereof or variation therefrom which conforms to the spirit of the invention is intended to be included within the scope of the claims.

What is claimed is:

1. A mercaptobutyl ether of cellulose.
2. A mercaptoalkyl ether of cellulose having at least two carbons in the mercaptoalkyl group.
3. An acetylthiobutyl ether of cellulose.
4. An acetylthioalkyl ether of cellulose wherein the alkyl group contains at least two carbons.
5. A polymer having a side chain connected to the chain of said polymer through ether oxygen and having on said side chain a bivalent sulphur separated from the ether oxygen by at least two carbons and in turn attached to a member of the class consisting of hydrogen, an acyl radical, and bivalent sulphur further bonded to a side chain linked by ether oxygen to such a polymer chain.
6. A polymer having an acylthio substituent on a side chain linked to the polymer chain through ether oxygen and separated from the ether oxygen by at least two carbons.
7. A polymer having a mercapto substituted side chain linked to the polymer chain through ether oxygen and separated from the ether oxygen by at least two carbons.
8. Process which comprises reacting a thiolcarboxylic acid with a polymer having an ethylenically unsaturated side chain linked to the polymer chain through oxygen.
9. Process which comprises reacting a thiolcarboxylic acid with a hydroxylated polymer having an ethylenically unsaturated side chain linked to the hydroxylated polymer chain through ether oxygen.
10. Process which comprises reacting a thiolcarboxylic acid with an hydroxylated polymer having an ethylenically unsaturated side chain linked to the hydroxylated polymer chain through ether oxygen in an inert solvent and in the presence of a peroxide catalyst.
11. Process which comprises reacting, in an inert solvent and in the presence of a peroxide catalyst, a thiolcarboxylic acid with a cellulose derivative having hydroxyl hydrogen replaced by an ethylenically unsaturated substituent.
12. Process which comprises reacting, in an inert solvent and in the presence of a peroxide catalyst, thiolacetic acid with an unsaturated ether of cellulose.
13. Process of claim 8 wherein the acyl-ether derivative is hydrolyzed to the corresponding thiol.
14. Process of claim 8 wherein the acyl-ether derivative is hydrolyzed to the corresponding thiol and this is oxidized to the corresponding disulphide.

WILLIAM JAMES BURKE.

CERTIFICATE OF CORRECTION.

Patent No. 2,384,888.  September 18, 1945.

WILLIAM JAMES BURKE.

It is hereby certified that error appears in the printed specification of the above numbered patent requiring correction as follows: Page 2, first column, line 19, for "intially" read --initially--; and second column, line 36, Example IV, for that portion of the formula reading " n' " read --n--; page 3, second column, line 13, for "general" read --generic--; and that the said Letters Patent should be read with this correction therein that the same may conform to the record of the case in the Patent Office.

Signed and sealed this 15th day of January, A. D. 1946.

Leslie Frazer (Seal)   First Assistant Commissioner of Patents.